United States Patent [19]
Lin

[11] 3,901,684

[45] Aug. 26, 1975

[54] METHOD FOR ALTERING PLANT FLOWERING AND SEXUAL REPRODUCTION

[75] Inventor: Kang Lin, Newark, Del.

[73] Assignee: E. I. Du Pont de Nemours and Company, Wilmington, Del.

[22] Filed: Jan. 30, 1973

[21] Appl. No.: 328,059

[52] U.S. Cl. .............. 71/100; 47/1.41; 71/101; 71/106; 71/105; 71/111; 260/455 A; 260/471 C

[51] Int. Cl. ............................................ A01n 9/12

[58] Field of Search ............ 71/100, 111, 101, 105, 71/106

[56] References Cited
UNITED STATES PATENTS

| | | | |
|---|---|---|---|
| 3,457,063 | 7/1969 | Neighbors | 71/111 |
| 3,664,823 | 5/1972 | Loux | 71/111 |

*Primary Examiner*—James O. Thomas, Jr.

[57] ABSTRACT

A method for altering plant flowering and/or plant sexual reproduction involving application of an allophanimidate such as methyl 4-(p-chlorophenyl)-N-methoxycarbonylallophanimidate or methyl 4-(p-chlorophenyl)-N-methylthiolcarbonylallophanimidate. A preferred use of the invention is to prevent corn inbreeding by applying the allophanimidate to the plant shortly before or at tassel emergence.

16 Claims, No Drawings

METHOD FOR ALTERING PLANT FLOWERING AND SEXUAL REPRODUCTION

BACKGROUND OF THE INVENTION

The allophanimidates of this invention and their use as herbicides are disclosed and claimed in copending U.S. application Ser. No. 325,357, filed Jan. 22, 1973, by Julius J. Fuchs and Kang Lin, which is a continuation-in-part of copending U.S. Patent Application Ser. No. 181,201, filed Sept. 16, 1971.

It has now been discovered that the compounds are useful as plant regulants in that they alter plant flowering and/or plant sexual reproduction.

SUMMARY OF THE INVENTION

This invention is a method of altering plant flowering and/or plant sexual reproduction which comprises applying an allophanimidate to the plant in an amount which is effective to alter flowering and/or sexual reproduction of the plant without causing substantial foliar burn, chlorosis or necrosis, the allophanimidate being a compound of either of the following formulas:

Formula I

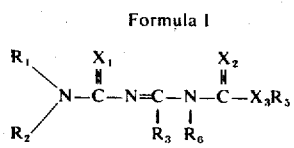

Formula II

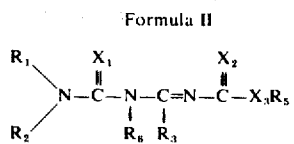

wherein $X_1$, $X_2$, and $X_3$ are oxygen or sulfur;
$R_1$ is hydrogen or alkyl of 1 through 4 carbon atoms;
$R_2$ is alkyl of 1 through 6 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms, benzyl, or

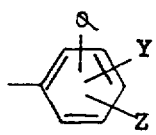

where
Y is hydrogen, halogen, alkyl of 1 through 4 carbon atoms, nitro, alkoxy of 1 through 4 carbon atoms, alkylthio of 1 through 4 carbon atoms, cyano, or trifluoromethyl; and
Z is hydrogen, halogen, methyl, ethyl, nitro, alkoxy of 1 through 4 carbon atoms, or alkylthio of 1 through 4 carbon atoms;
Q is hydrogen, halogen, or methyl;
$R_3$ is $SR_4$ or $OR_4$;
where
$R_4$ is alkyl of 1 through 6 carbon atoms, cycloalkyl of 3 through 8 carbon atoms, alkenyl of 3 through 4 carbon atoms, alkynyl of 3 through 4 carbon atoms, benzyl or phenyl; and
$R_5$ is alkyl of 1 through 12 carbon atoms substituted with 0–3 chlorine atoms or 0–1 methoxy group, alkenyl of 3 through 4 carbon atoms, cycloalkyl of 5 through 8 carbon atoms, benzyl, or

where
Y and Z are as previously defined;
$R_6$ is hydrogen or alkyl 1 through 3 carbon atoms.

Preferred within Formula I because of ease of synthesis, higher activity and low phytotoxicity are those compounds where
$R_1$ is hydrogen;
$R_2$ is alkyl of 1 through 6 carbon atoms, alkenyl of 3 through 4 carbon atoms, or

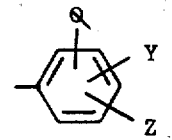

where
Y, Z and Q are as previously defined;
$R_3$ is $SR_4$ or $OR_4$;
$R_4$ is alkyl of 1 through 6 carbon atoms or allyl;
$R_5$ is alkyl of 1 through 4 carbon atoms;
$R_6$ is hydrogen or methyl;
$X_1$ and $X_2$ are oxygen; and
$X_3$ is oxygen or sulfur.

Particularly preferred highly active compounds are those compounds where
$R_1$ is hydrogen;
$R_2$ is

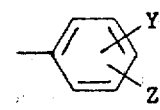

where
Y is hydrogen, halogen, or methyl;
Z is halogen;
$R_3$ is $OR_4$;
$R_4$ is methyl or ethyl;
$R_5$ is methyl or ethyl;
$R_6$ is hydrogen;
$X_1$ and $X_2$ are oxygen; and
$X_3$ is oxygen or sulfur.

Most preferred compounds because of highest activity are the following: methyl 4-(p-chlorophenyl)-N-methoxycarbonylallophanimidate  methyl 4-(p-chlorophenyl)-N-methylthiolacarbonylallophanimidate It should be understood that tautomeric forms of the molecule are possible when $R_6$ is hydrogen;

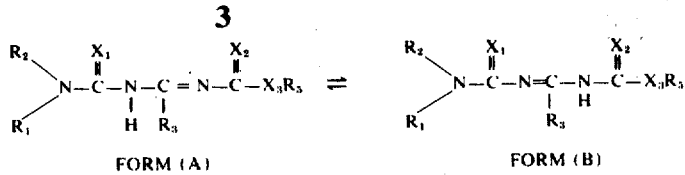

For this reason, all compounds when $R_6$ is hydrogen are named allophanimidates according to form (A). Compounds of Form (C) are also named as allophanimidates, while compounds of Form (D) are named as carbamates.

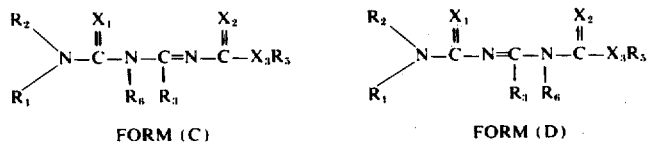

A preferred embodiment of this invention is a method of preventing inbreeding of corn which comprises applying an allophanimidate of Formula I or Formula II to the corn before or at tassel emergence in an amount sufficient to prevent self-fertilization but insufficient to cause substantial foliar burn, cholorsis or necrosis.

equivalent of triethylamine (equation 2). The methylene chloride solution is washed with water, dried, and stripped to afford the carbamates and the thioallophanimidates of this invention in good purity. As can be seen from the discussion of nomenclature above, carbamates result when $R_6$ is alkyl and thioallophanimidates result when $R_6$ is hydrogen. The reaction product can be further purified by dissolving it in dimethylformamide and precipitating it by adding water or by recrystallization from hexane.

Thioallophanimidates of Form (C) can be obtained by reacting the 2-thiopseudourea first with a chloroformate and then an isocyanate as in equations 3 and 4.

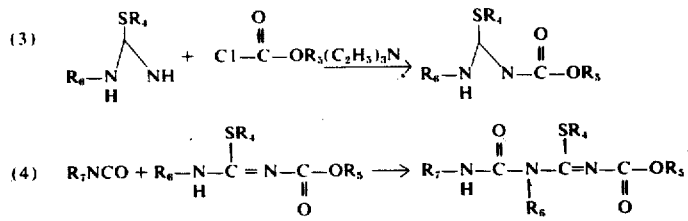

DETAILED DESCRIPTION OF THE INVENTION

The compounds of the invention can be made by the process illustrated by the following equations:

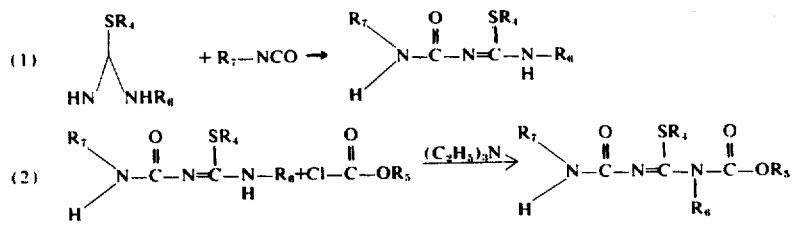

where
$R_4$, $R_5$ and $R_6$ are as previously defined and
$R_7$ is $R_1$ or $R_2$.

In equation (1) the 2-thiopsaudourea is liberated from its corresponding chloride or sulfate with one mole of base and reacted with an isocyanate in a solvent, e.g., water, aqueous methanol or aqueous acetone, at about 0°C. The reaction mass is warmed to room temperature and the solvent removed by evaporation. The intermediate thioallophanimidate is collected by filtration and dried (This reaction is essentially the same method as described in Organic Synthesis, 42, 87, for the preparation of methyl 4-phenyl-3-thioallophanimidate).

The intermediate is reacted with one equivalent of a chloroformate in methylene chloride containing one where
$R_4$, $R_5$, $R_6$ and $R_7$ are as defined for equations (1) and (2).

In Equation (3) the 2-thiopseudourea sulfate and a chloroformate in water are cooled to about 0°C. and two equivalents of base are added gradually. The reaction mixture is allowed to come to room temperature and then extracted with methylene chloride. The methylene extract is dried and evaporated to afford the intermediate alkyl N-(1-alkylamino-1-methylthiomethylene)carbamate or alkyl N-(1-amino-1-methylthiomethylene)carbamate in excellent purity.

In equation (4) the intermediate is dissolved in methylene chloride and one equivalent of isocyanate is added. The mixture is stirred for several hours, and then evaporated to produce the thioallophanimidates in excellent yield and purity. The product can be further purified using the techniques set forth above.

Alkoxycarbonylthioallophanimidates with 2 substituents in the 4-position can be prepared by starting with the product of reaction (3) and reacting it with a carbamoyl chloride in the presence of triethylamine as illustrated by reaction (5).

(5)
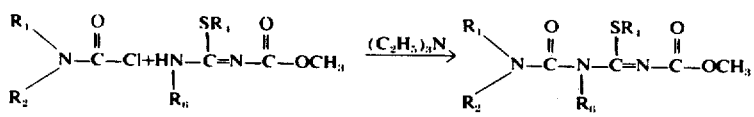

In reaction (5) the reactants are heated for 1–3 hours in the presence of triethylamine in a solvent such as benzene or toluene. After completion of the reaction, the solvent is evaporated, the residue extracted with water to dissolve water-soluble substances, and the residue recrystallized from benzene.

The corresponding disubstituted carbamates are similarly prepared from 2-thiopseudourea, carbamoyl chloride and triethylamine as illustrated by reactions (6) and (7).

(6)
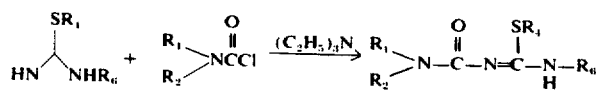

(7)
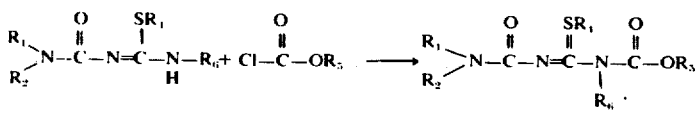

The following examples are offered to illustrate the processes described above. All parts are parts by weight unless otherwise indicated.

EXAMPLE 1

Methyl 4-tert-butyl-N-methylthiolcarbonyl-1-thioallophanimidate

To 139 parts 2-methyl-2-thiopseudourea sulfate in 1000 parts 50% aqueous methanol at 0°C. is added dropwise 88 parts 50% sodium hydroxide, followed by 90 parts tert-butylisocyanate in 200 parts tetrahydrofuran. The solution is then stripped of most of the methanol and tetrahydrofuran on a rotary evaporator and filterd to yield after drying 90 parts methyl 4-tert-butyl-1-thioallophanimidate melting at 102°–104°C.

To 5.67 parts of the above compound and 4 parts triethylamine in 50 parts methylene chloride at 0°C. is added dropwise 3.3 parts methyl chlorothiolformate in 5 parts methylene chloride. The solution is stirred overnight and washed once with water. After drying and evaporation of the solvent on a rotary evaporator, there is obtained 3.8 parts methyl 4-tert-butyl-N-methylthiolcarbonyl-1-thioallophanimidate melting at 102°–105°C.

EXAMPLE 2

Methyl-4-tert-Butyl-N-methoxycarbonyl-1-thioallophanimidate

To 5.67 parts of methyl 4-tert-butyl-1-thioallophanimidate, prepared as in Example 1, and 4 parts of triethylamine in 50 parts methylene chloride at 0°C. is added dropwise 2.8 parts methyl chloroformate in 5 parts methylene chloride. The solution is stirred overnight and washed once with water. After drying and evaporation of the solvent on a rotary evaporator, there is obtained an oil which turned crystalline. After trituration with hexane it affords 1.9 parts methyl 4-tert-butyl-N-methoxycarbonyl-1-thioallophanimidate melting at 87°–90°C.

EXAMPLE 3

Methyl 4-isopropyl-N-methoxycarbonyl-1-thioallophanimidate

To 69.5 parts 2-methyl-2-thiopseudourea sulfate and 47 parts of methyl chloroformate in 1000 parts water at 0°C is added dropwise 56.9 parts of potassium hydroxide in 200 parts of water. The reaction mixture is stirred at room temperature for 3 hours and then extracted with methylene chloride. The methylene chloride extract is dried and the solvent evaporated on a rotary evaporator to give 45 parts of methyl N-(1-amino-1-methylthiomethylene)carbamate melting at 72°–77°C.

Seventy-four parts of the above compound and 47 parts of isopropyl isocyanate in 300 parts methylene chloride is stirred overnight. The solvent is evaporated on a rotary evaporator to give 113.6 parts methyl 4-isopropyl-N-methoxycarbonyl-1-thioallophanimidate melting at 129°–132°C.

The following allophanimidates can be similarly prepared: methyl 4-cyclopentyl-2-methyl-N-methoxycarbonyl-1-thioallophanimidate, and methyl 4-cyclohexyl-2-propyl-N-methoxycarbonyl-1-thioallophanimidate.

EXAMPLE 4

Methyl 4-methyl-N-methylthiolcarbonyl-1-thioallophanimidate

To 69.5 parts 2-methyl-2-thiopseudourea sulfate and 110 parts methyl chlorothiolformate in 500 ml. of water is added dropwise at 0°–5°C. 120 parts 50% sodium hydroxide. The reaction mixture is stirred at 0°–5°C. for 1 hour and then at room temperature for 2 hours. The solution is extracted with methylene chloride. The methylene chloride extract is then dried and the solvent evaporated on a rotary evaporator to give 47 parts of methyl N-(1-amino-1-methylthiomethylene)thiolcarbamate melting at 75°–76°C.

To 8.2 parts of the above compound in 75 parts methylene chloride is added 3.1 parts methyl isocyanate. The reaction mixture is stirred at room temperature for 3 hours, and then stripped of solvent on a rotary evaporator to give 10 parts methyl 4-methyl-N-methylthiolcarbonyl-1-thioallophanimidate melting at 115°–117°C.

EXAMPLE 5

Methyl 4-(p-chlorophenyl)-N-methoxycarbonyl-1-thioallophanimidate

To 7.2 parts methyl N-(1-amino-1-methylthiomethylene)carbamate prepared as in Example 3 in 100 parts methylene chloride is added 8.4 parts p-chlorophenyl isocyanate. The reaction mixture is stirred overnight and the solvent evaporated on a rotary evaporator. The residue is dissolved in dimethylformamide and water is added. The precipitate is collected by filtration and then dried to give 10.4 parts methyl 4-(p-chlorophenyl)-N-methoxycarbonyl-1-thioallophanimidate melting at 73°–74.5°C.

EXAMPLE 6

Methyl 4-sec-butyl-N-methoxycarbonyl-1-thioallophanimidate

To 7.2 parts methyl N-(1-amino-1-methylthiomethylene)carbamate, prepared as in Example 3, in 50 parts methylene chloride is added 5.5 parts sec-butylisocyanate. The reaction mixture is stirred overnight and the solvent is evaporated on a rotary evaporator to give 12 parts methyl 4-sec-butyl-N-methoxycarbonyl-1-thioallophanimidate melting at 102°–104°C.

EXAMPLE 7

Methyl 4-isopropyl-N-ethoxycarbonyl-1-thioallophanimidate

To 138 parts 2-methyl-2-thiopseudourea in 500 parts water at 0°–10°C. is added 80 parts 50% sodium hydroxide. One liter of cold acetone is added followed by dropwise addition of 85 parts isopropyl isocyanate. The mixture is allowed to stay at room temperature for 2 hours and evaporated on a rotary evaporator. The solid is collected and dried to give 150 parts methyl 4-isopropyl-1-thioallophanimidate melting at 81°–85°C.

To 8.8 parts of the above compound and 6.0 parts ethyl chloroformate at 0°C. is added dropwise 8.4 parts triethylamine. The reaction is stirred at room temperature for 3 hours. Water is added and stirred for a while. The methylene chloride layer is dried and evaporated on a rotary evaporator to give after hexane trituration, 10.2 parts methyl 4-isopropyl-N-ethoxycarbonyl-1-thioallophanimidate melting at 90°–92°C.

EXAMPLE 8

Methyl 4-propyl-N-methoxycarbonyl-1-thioallophanimidate

To 7.4 parts of methyl N-(1-amino-1-methylthiomethylene)carbamate prepared as in Example 3 in 50 parts of methylene chloride is added 4.7 parts of propyl isocyanate. The reaction mixture is stirred overnight and the solvent is stripped on a rotary evaporator to give a solid which is dissolved in benzene and precipitated by adding hexane. The solid is collected and dried to give 10 parts of methyl 4-propyl-N-methoxycarbonyl-1-thioallophanimidate melting at 68°–69°C.

EXAMPLE 9

Methyl 4-(p-chlorophenyl)-N-methoxycarbonylallophanimidate

To 13 parts of methyl N-(1-amino-1-methoxymethylene)carbamate, m.p. 36°–39.5°, prepared similar to the procedure in Example 3 for methyl N-(1-amino-1-methylthiomethylene)carbamate in 140 parts of methylene chloride is added 15 parts of p-chlorophenyl isocyanate. The reaction mixture is stirred overnight and the solution filtered to give 10 parts of methyl 4-(p-chlorophenyl)-N-methoxycarbonylallophanimidate melting at 170° dec.

EXAMPLE 10

Methyl 4-(p-chlorophenyl)-N-methylthiolcarbonylallophanimidate

To 9 parts of methyl N-(1-amino-1-methoxymethylene)thiolcarbamate, m.p. 55°–57°, prepared similar to the procedure in Example 3 for methyl N-(1-amino-1-methylthiomethylene)carbamate in 20 parts of methylene chloride is added 9 parts of p-chlorophenyl isocyanate. The reaction mixture is stirred overnight and the solution is filtered to give 14 parts of methyl 4-(p-chlorophenyl)-N-methylthiolcarbonylallophanimidate melting at 153°–155°.

The following allophanimidates can be prepared by the procedure of Example 2 by substituting the listed 2-substituted thiopseudoureas and pseudoureas for 2-methyl-2-thiopseudourea, by replacing tert-butylisocyanate with various isocyanates or isothiocyanates, and by using various chloroformates, chlorothiolformates, or chlorodithioformates in place of methyl chloroformate.

| Pseudothiourea or Psueodurea | Isocyanate or Isothiocyanate | Formate, Thiolformate or Dithioformate | Allophanimidates |
|---|---|---|---|
| 2-hexyl-2-thiopseudourea | methyl isocyanate | methyl chloroformate | hexyl 4-methyl-N-methoxycarbonyl-1-thioallophanimidate |
| 2-methyl-2-thiopseudourea | hexyl isocyanate | phenyl chloroformate | methyl 4-hexyl-N-phenoxycarbonyl-1-thioallophanimidate |
| 2-cyclopropyl-2-thiopseudourea | cyclopropyl isocyanate | p-chlorophenyl chloroformate | cyclopropyl 4-cyclopropyl-N-(p-chlorophenoxycarbonyl)-1-thioallophanimidate |
| 2-cyclooctyl-2-thiopseudourea | cyclooctyl isocyanate | m-bromophenyl chloroformate | cyclooctyl 4-cyclooctyl-N-(m-bromophenoxycarbonyl)-1-thioallophanimidate |
| 2-allyl-2-thiopseudourea | cyclohexylmethyl isocyanate | o-iodophenyl chloroformate | allyl 4-cyclohexylmethyl-N-(o-iodophenoxycarbonyl)-1-thioallophanimidate |
| 2-(3-methylallyl)-2-thiopseudourea | allyl isocyanate | o-fluorophenyl chloroformate | 3-methylallyl 4-allyl-N-(o-fluorophenoxycarbonyl)-1-thioallophanimidate |
| 2-methylpseudourea | 3-methylallyl isocyanate | p-methylphenyl chloroformate | methyl 4-(3-methylallyl)-N-(p-methylphenoxycarbonyl)-allophanimidate |
| 2-hexyl-2-thiopseudourea | propargyl isocyanate | m-ethylphenyl chloroformate | hexyl 4-propargyl-N-(m-ethylphenoxycarbonyl)-1-thioallophanimidate |
| 2-(3-methylpropargyl)-2-thiopseudourea | cyclopropylmethyl isocyanate | methyl chloroformate | 3-methylpropargyl 4-cyclopropylmethyl-N-methoxycarbonyl-1-thioallophanimidate |
| 2-cyclopropylpseudourea | 3-methylpropargyl isocyanate | p-nitrophenyl chloroformate | cyclopropyl 4-(3-methylpropargyl)-N-(p-nitrophenoxycarbonyl)-allophanimidate |
| 2-cyclooctylpseudourea | benzyl isocyanate | p-methoxyphenyl chloroformate | cyclooctyl 4-benzyl-N-(p-methoxyphenoxycarbonyl)-allophanimidate |
| 2-allylpseudourea | phenyl isocyanate | dodecyl chloroformate | allyl 4-phenyl-N-dodecyloxycarbonyl-allophanimidate |
| 2-(3-methylallyl)pseudourea | p-chlorophenyl isocyanate | allyl chloroformate | 3-methylallyl 4-(p-chlorophenyl)-N-allyloxycarbonyl-allophanimidate |
| 2-methyl-2-thiopseudourea | m-bromophenyl isocyanate | 3-methylallyl chloroformate | methyl 4-(m-bromophenyl)-N-(3-methylallyloxycarbonyl)-1-thioallophanimidate |
| 2-methyl-2-thiopseudourea | o-iodophenyl isocyanate | cyclopentyl chloroformate | methyl 4-(o-iodophenyl)-N-(cyclopentyloxycarbonyl)-thioallophanimidate |
| 2-methyl-2-thiopseudourea | o-fluorophenyl isocyanate | cyclooctyl chloroformate | methyl 4-(o-fluorophenyl)-N-cyclooctyloxycarbonyl-1-thioallophanimidate |
| 2-methyl-2-thiopseudourea | p-methylphenyl isocyanate | benzyl chloroformate | methyl 4-(p-methylphenyl)-N-benzyloxycarbonyl-1-thioallophanimidate |
| 2-methyl-2-thiopseudourea | m-ethylphenyl isocyanate | methyl chlorothiolformate | methyl 4-(m-ethylphenyl)-N-methylthiolcarbonyl-1-thioallophanimidate |
| 2-methyl-2-thiopseudourea | p-nitrophenyl isocyanate | m-butoxyphenyl chlorothiolformate | methyl 4-(p-nitrophenyl)-N-(m-butoxyphenylthiolcarbonyl)-1-thioallophanimidate |
| 2-methyl-2-thiopseudourea | p-methoxyphenyl isothiocyanate | p-methylthiophenyl chlorothiolformate | methyl 4-(p-methoxyphenyl)-N-(p-methylthiophenylthiocarbonyl)-1,3-dithioallophanimidate |
| 2-methyl-2-thiopseudourea | m-butyloxyphenyl isothiocyanate | m-butylthiophenyl chlorothiolformate | methyl 4-(m-butoxyphenyl)-N-(m-butylthiophenylthiolcarbonyl)-1,3-dithioallophanimidate |
| 2-methyl-2-thiopseudourea | p-methylthiophenyl isothiocyanate | m-trifluoromethylphenyl chlorothiolformate | methyl 4-(p-methylthiophenyl)-N-(m-trifluoromethylphenylthiolcarbonyl)-1,3-dithioallophanimidate |
| 2-methyl-2-thiopseudourea | m-butylthiophenyl isothiocyanate | p-cyanophenyl chlorothiolformate | methyl 4-(m-butylthiophenyl)-N-(p-cyanophenylthiolcarbonyl)-1,3-dithioallophanimidate |
| 2-methyl-2-thiopseudourea | m-trifluoromethylphenyl isothiocyanate | 3,4-dichlorophenyl chlorothiolformate | methyl 4-(m-trifluoromethylphenyl)-N-3,4-dichlorophenylthiolcarbonyl)-1,3-dithioallophanimidate |
| 2-methyl-2-thiopseudourea | p-cyanophenyl isothiocyanate | methyl chlorodithioformate | methyl 4-(p-cyanophenyl)-N-(methylthiolthiocarbonyl)-1,3-dithioallophanimidate |
| 2-phenyl-2-thiopseudourea | 3,4-dichlorophenyl isothiocyanate | 3,5-dichlorophenyl chlorodithioformate | phenyl 4-(3,4-dichlorophenyl)-N-(3,5-dichlorophenylthiolthiocarbonyl)-1,3-dithioallophanimidate |
| 2-benzyl-2-thiopseudourea | 3,5-dichlorophenyl isothiocyanate | o-chloro-p-methylphenyl chlorodithioformate | benzyl 4-(3,5-dichlorophenyl)-N-(o-chloro-p-methylphenylthiolthiocarbonyl)-1,3-dithioallophanimidate |
| 2-propargyl-2-thiopseudourea | o-chloro-p-methylphenyl isothiocyanate | 2,4-dinitrophenyl chlorodithioformate | propargyl 4-(o-chloro-p-methylphenyl)-N-(2,4-dinitrophenylthiolthiocarbonyl)-1,3-dithioallophanimidate |
| 2-methylpseudourea | p-chlorophenyl isocyanate | methoxyethyl chloroformate | methyl 4-(p-chlorophenyl)-N-(2-methoxyethoxycarbonyl)allophanimidate |
| 2-methylpseudourea | p-chlorophenyl isocyanate | 2,2,2-trichloroethyl chloroformate | methyl 4-(p-chlorophenyl)-N-(2,2,2-trichloroethoxycarbonyl)allophanimidate |
| 2-methylpseudourea | 2-bromo-4,6-dichlorophenyl isocyanata | methyl chloroformate | methyl 4-(2-bromo-4,6-dichlorophenyl)-N-methoxycarbonylallophanimidate |
| 2-methylpseudourea | 2,4,5-trichlorophenyl isocyanate | methyl chloroformate | methyl 4-(2,4,5-trichlorophenyl)-N-methoxycarbonylallophanimidate |
| 2-methylpseudourea | 2,4,6-trimethylphenyl isocyanate | methyl chloroformate | methyl 4-(2,4,6-trimethylphenyl)-N-methoxycarbonylallophanimidate |
| 2-methylpseudourea | 2,4-dichloro-6-methylphenyl isocyanate | methyl chloroformate | methyl 4-(2,4-dichloro-6-methylphenyl)-N-methoxycarbonylallophanimidate |

| Pseudothiourea or Psuedourea | Isocyanate or Isothiocyanate | Formate, Thiolformate or Dithioformate | Allophanimidates |
|---|---|---|---|
| 2-methylpseudourea | p-bromophenyl isocyanate | methyl chloroformate | methyl 4-(p-bromophenyl)-N-methoxycarbonylallophanimidate |
| 2-methylpseudourea | p-bromophenyl isocyanate | methyl chlorothiolformate | methyl 4-(p-bromophenyl)-N-methylthiolcarbonylallophanimidate |
| 2-methylpseudourea | p-methylphenyl isocyanate | methyl chloroformate | methyl 4-(p-methylphenyl)-N-methoxycarbonylallophanimidate |
| 2-methylpseudourea | p-methylphenyl isocyanate | methyl chlorothiolformate | methyl 4-(p-methylphenyl)-N-methylthiolcarbonylallophanimidate |
| 2-methylpseudourea | p-methoxyphenyl isocyanate | methyl chloroformate | methyl 4-(p-methoxyphenyl)-N-methoxycarbonylallophanimidate |
| 2-methylpseudourea | p-methoxyphenyl isocyanate | methyl chloroformate | methyl 4-(p-methoxyphenyl)-N-methylthiolcarbonylallophanimidate |
| 2-methylpseudourea | p-fluorophenyl isocyanate | methyl chloroformate | methyl 4-(p-fluorophenyl)-N-methoxycarbonylallophanimidate |
| 2-methylpseudourea | p-fluorophenyl isocyanate | methyl chlorothiolformate | methyl 4-(p-florophenyl)-N-methylthiolcarbonylallophanimidate |
| 2-methylpseudourea | 2,4-dichlorophenyl isocyanate | methyl chloroformate | methyl 4-(2,4-dichlorophenyl)-N-methoxycarbonylallophanimidate |
| 2-methylpseudourea | 2,4-dichlorophenyl isocyanate | methyl chlorothiolformate | methyl 4-(2,4-dichlorophenyl-N-methylthiolcarbonylallophanimidate |
| 2-methylpseudourea | m-butylphenyl isocyanate | m-butylphenyl chloroformate | methyl 4-(m-butylphenyl)-N-(m-butylphenoxycarbonyl)-allophanimidate |

Similarly, the following carbamates can be prepared.

| Pseudothiourea, or Pseudourea | Isocyanate or Isothiocyanate | Formate, Thiolformate or Dithioformate | Carbamates |
|---|---|---|---|
| 1,2-dimethyl-2-thiopseudourea | cyclopentyl isocyanate | methyl chloroformate | methyl N-(1-cyclopentylcarbamylimino-1-methylthiomethyl)-N-methylcarbamate |
| 1,2-dimethyl-2-thiopseudourea | cyclohexyl isocyanate | methyl chloroformate | methyl N-(1-cyclohexylcarbamylimino-1-methylthiomethyl)-N-methylcarbamate |
| 2-methyl-1-propyl-2-thiopseudourea | cyclopentyl isocyanate | methyl chloroformate | methyl N-(1-cyclopentylcarbamylimino-1-methylthiomethyl)-N-propylcarbamate |
| 1,2-dimethyl pseudourea | p-chlorophenyl isocyanate | methyl chloroformate | methyl N-(1-p-chlorophenylcarbamylimino-1-methoxymethyl)-N-methylcarbamate |

EXAMPLE 11
Methyl 4,4-dimethyl-N-methoxycarbonyl-1-thio-allophanimidate

To a solution of 14.8 parts of N-(1-amino-1-methylthiomethylene)carbamate and 10.1 parts of triethylamine in 100 parts of benzene is added 11 parts dimethylcarbamoyl chloride and the reaction mixture refluxed for two hours. The reaction mixture is then subjected to vacuum and the solvent evaporated. The residue is then triturated with 200 parts of water at room temperature. the remaining solids are then recrystallized from benzene to give pure methyl 4,4-dimethyl-N-methoxycarbonyl-1-thioallophanimidate.

By using appropriate starting materials, the following compounds can be prepared in the same manner.
methyl 4,4-diethyl-N-methoxycarbonyl-1-thioallophanimidate
methyl 4-methyl-4-butyl-N-methoxy-carbonyl-1-thioallophanimidate

Formulation of the Compounds

Formulations of the compounds of Formulas I and II for use in this invention can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1% to 99% by weight of active ingredient(s) and at least one of a) about 0.1% to 20% surfactant(s) and b) about 5% to 99% solid or liquid diluent(s). More specifically, they will contain these ingredients in the following approximate proportions:

| | Percent by Weight | | |
|---|---|---|---|
| | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules and Pellets | 1–95 | 5–99 | 0–15 |
| High Strength Compositions | 90–99 | 0–10 | 0–2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing. Lower concentrations of active ingredient can aid in accurate application at the very low rates reached for this invention. Sprayable and dust formulations are preferred.

Typical solid diluents are described in Watkins, et al., "Handbook of Insecticide Dust Diluents and Carriers", 2nd. Edn., Dorland Books, Caldwell, N.J. The more absorptive diluents are preferred for wettable powders and the denser ones for dusts. Typical liquid diluents and solvents are described in Marsden, "Solvents Guide", second edition, Interscience, New York, 1950. Solubility under 0.5 % is preferred for suspension concentrates; solution concentrates are preferably stable against phase separation at 0°C. "McCutcheon's Detergents and Emulsifiers Annual", Allured Publ. Corp., Ridgewood, New Jersey, as well as Sisely and Wood, Ridgewood, New Jersey, as well as Sisely and Wood, "Encyclopedia of Surface Active Agents", Chemical Publ. Co., Inc., New York, 1964, list surfactants and recommended uses. All formulations can contain minor amounts of additives to reduce foam, caking, corrosion, microbiological growth, etc.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules and pellets may be made by spraying the active material upon preformed granular carriers or by agglomeration techniques. See J. E. Browning, "Agglomeration", *Chemical Engineering*, Dec. 4, 1967, pp. 147ff. and "Perry's Chemical Engineer's Handbook", 4th, Edn., McGraw-Hill, N.Y., 1963, pp. 8-59ff.

For further information regarding the art of formulation, see for example:

H. M. Loux, U.S. Pat. No. 3,235,361, Feb. 15, 1966, Col. 6, Line 16 through Col. 7, Line 19 and Examples 10 through 41.

R. W. Luckenbaugh, U.S. Pat. No. 3,309,192, Mar. 14, 1967, Col. 5 Line 43 through Col. 7 Line 62 and Ex. 8, 12, 15, 39, 41, 52, 53, 58, 132, 138–140, 162–164, 166, 167, 169–182.

H. Gysin and E. Knusli, U.S. Pat. No. 2,891,855, June 23, 1959, Col. 3 Line 66 through Col. 5 Line 17 and Examples 1–4.

G. C. Klingman, "Weed Control as a Science", John Wiley and Sons, Inc., New York, 1961 pp. 81–96.

J. D. Fryer and S. A. Evans, "Weed Control Handbook", fifth edition Blackwell Scientific Publications, Oxford, 1968, pp. 101–103.

Typical formulations are shown in the following examples. All percentages are by weight.

EXAMPLE 12

| Wettable Powder | Percent |
|---|---|
| methyl 4-(p-chlorophenyl)-N-methylthiolcarbonyl allophanimidate | 40 |
| dioctyl sodium sulfosuccinate | 1.5 |
| sodium ligninsulfonate | 3 |
| low viscosity methyl cellulose | 1.5 |
| attapulgite | 54 |

Thoroughly blend the ingredients then pass through an air mill to produce an average particle size under 15 microns. Reblend and sift through a U.S.S. No. 50 sieve (0.3 mm opening) before packaging.

All compounds of the invention may be formulated in the same manner.

EXAMPLE 13

| High Strength Concentrate | Percent |
|---|---|
| methyl 4-(p-chlorophenyl)-N-methoxycarbonyl allophanimidate | 98.5 |
| silica aerogel | 0.5 |
| synthetic amorphous fine silica | 1.0 |

Blend and grind the ingredients in a hammer mill to produce a high strength concentrate essentially all passing a U.S.S. No. 50 sieve (0.3 mm openings). This material may then be formulated in a variety of ways.

EXAMPLE 14

| Dust | Percent |
|---|---|
| high strength concentrate. Example 13 | 25.4 |
| pyrophyllite, powdered | 74.6 |

Thoroughly blend the ingredients and package for use.

EXAMPLE 15

| Aqueous Suspension | Percent |
|---|---|
| methyl 4-(p-chlorophenyl)-N-methoxycarbonyl allophanimidate | 25 |
| hydrated attapulgite | 3 |
| crude calcium ligninsulfonate | 10 |
| sodium dihydrogen phosphate | 0.5 |
| water | 61.5 |

Grind the ingredients together in a sand mill until the solid particles have been reduced to diameters under 10 microns.

EXAMPLE 16

| Oil suspension | Percent |
|---|---|
| methyl 4-(p-chlorophenyl)-N-methylthiolcarbonyl allophanimidate | 25 |
| polyoxyethylene sorbitol hexaoleate | 5 |
| highly aliphatic hydrocarbon oil | 70 |

Grind the ingredients together in a sand mill until the solid particles have been reduced to under about 5 microns. The resulting thick suspension may be applied directly, but preferably after being extended with oils or emulsified in water.

Use of the Invention

This invention can be used to facilitate the production of many hybrid crops. For example, in the production of hybrid corn, it can be used to prevent inbreeding. An allophanimidate of formula I or formula II is applied to the corn plant, to be used as the female parent, preferably in a spray or dust formulation, shortly before or at tassel emergence. This treatment substantially prevents pollen shed and may also destroy pollen viability, thus making it unnecessary to detassel. The invention can be used in a similar manner to prevent inbreeding of other crop plants, e.g. wheat, rice, and soybeans, by treating the plants at or near flowering with an allophanimidate of formula I or formula II.

The invention can also be used to alter fruit set pattern of various crops such as cotton, tomatoes, citrus fruit, peaches, and apples. In these crops it is often desirable to prevent late fruit set or development in order to facilitate mechanical harvesting, and/or eliminate the necessity of thinning. This can be accomplished by applying an allophanimidate of formula I or formula II to the plant after the desired amount of fruit set has taken place.

Similarly, the invention can be used to eliminate fruit set altogether on certain types of ornamentals, e.g. locust, and mimosa trees, where the fruit may be considered undesirable.

The invention can be used to prevent seed development in hay crops such as alfalfa. This is considered desirable because the energy that the plant would otherwise use to develop seeds can be used to increase forage development. Here again, the time to treat the plant is at or near flowering.

Another use for the invention is to prevent asparagus seed development. Asparagus plants are male or female. Female plants are about 20% less productive than male plants, because of the energy utilized in seed development. By spraying the male plants at or just before flowering with a formulation of an allophanimidate of formula I or formula II, fertilization and seed development can be substantially reduced or prevented, thus increasing yield of the female plants. Prevention of asparagus seed development is also desirable because otherwise the seeds are dropped, germinate, and the seedlings become a weed problem for the mature plants.

Presently in new strawberry plantings, the flowers are pinched off during the first year in order to prevent fruit set. Fruit hinders development of the strawberry plant bed. By use of this invention, i.e., by applying an allophanimidate of formula I or formula II to the plants at or near flowering, the need for hand-pinching the flower buds can be eliminated.

Another use of the invention is to prevent fruit set or seed development in ceretain crops which are not harvested for fruit or seed. For example, by applying one of the allophanimidates to potato plants at or near flowering, fruit and seed development which interfere with tuber development, can be prevented.

Still another use for the invention is to control pollen development and/or release in certain noxious weeds, e.g. ragweed.

In this invention the allophanimidates of formulas I and II are applied to the plant in an amount which is sufficient to produce the desired change in flowering and/or sexual reproduction, but which is insufficient to cause substantial foliar burn, chlorosis, or necrosis. The allophanimidates vary in degree of phytotoxicity, and the phytotoxicity of a given allophanimidate varies with the plant species. Thus, it is not possible to state a range of application rates which will be applicable for all allophanimidates and all plant species. In general, rates in the range of about 0.1 to 10 kg./ha. will be used. The permissible rates for any combination of allophanimidates and plant species can be readily established empirically.

The capability of two allophanimidates of formulas I and II to affect flowering and sexual reproduction of plants is shown in the following greenhouse tests:

A. Foliar sprays of methyl 4-(p-chlorophenyl)-N-methoxycarbonylallophanimidate and methyl 4-(p-chlorophenyl)-N-methylthiol-carbonylallophanimidate on Tenderette bush snap beans in the bud stage prevented fruit set 3 weeks with little effect on vegetative growth. Plants were about 24 days old and 25 to 30 cm tall when sprayed. Data from these greenhouse tests are summarized below:

TABLE 1

| | Rate kg/ha | 3-Week Response Rating[1] | Average Number of Fruit[2] |
|---|---|---|---|
| methyl 4-(p-chloro-phenyl)-N-methoxy-carbonylallophani-midate | 2.20 0.56 0.14 | 1G, 1S, AB AB AB | 0 0 0 |
| methyl 4-(p-chloro-phenyl)-N-methyl-thiolcarbonyl-allophanimidate | 2.20 0.56 0.14 | 1G, 2C, AB 1C, AB AB | 0 0 0 |
| Solvent control | -- | 0 · | 9 |

[1] G - growth retarded, S - albinism, C - chlorosis, AB - abscised buds or flowers. 0 - no effect, 10 - maximum response
[2] Average of 4 replications B. Agway 151-S hybrid field corn was grown in 8-inch pots to the stage where tassels were barely visible deep in some whorls. Foliar sprays of each of methyl 4-(p-chlorophenyl)-N-methoxycarbonylallophanimidate and methyl 4-(p-chlorophenyl)-N-methylthiolcarbonylallophanimidate at both 4.5 kg/ha and 1.1 kg/ha were then applied. Pollen shed was inhibited when plants were observed 11 days later.

I claim:

1. A method for preventing pollen shed in crop plants comprising applying an allophanimidate to the plant in an amount which is effective to prevent pollen shed without causing substantial foliar burn, chlorosis, or necrosis, the allophanimidate being a compound of either of the following formulas:

$$\begin{array}{c} R_1 \\ \diagdown \\ R_2 \end{array} N-\overset{X_1}{\underset{\|}{C}}-N=C-\underset{\underset{R_3}{|}}{N}-\overset{X_2}{\underset{\|}{C}}-X_3R_5 \\ \phantom{xxxxxxxxxxxx} \underset{R_6}{|}$$

$$\begin{array}{c} R_1 \\ \diagdown \\ R_2 \end{array} N-\overset{X_1}{\underset{\|}{C}}-N-C=N-\overset{X_2}{\underset{\|}{C}}-X_3R_5 \\ \phantom{xxxxxxxxxxx} \underset{R_6}{|}\;\underset{R_3}{|}$$

wherein
$R_1$ is hydrogen
$R_2$ is

[phenyl ring with substituents Y and Z]

where
Y is hydrogen, halogen, or methyl; and
Z is halogen;
$R_3$ is $OR_4$;
$R_4$ is methyl or ethyl;
$R_5$ is methyl or ethyl;
$R_6$ is hydrogen;
$X_1$ and $X_2$ are oxygen; and
$X_3$ is oxygen or sulfur.

2. Method of claim 1 where the crop is a cereal grain crop.

3. Method of claim 2 where the allophanimidate is methyl 4-(p-chlorophenyl)-N-methoxycarbonylallophanimidate.

4. Method of claim 2 where the allophanimidate is methyl 4-(p-chlorophenyl)-N-methylthiolcarbonylallophanimidate.

5. Method of claim 2 where the crop is corn.

6. Method of claim 5 where the allophanimidate is methyl-4-(p-chlorophenyl)-N-methoxycarbonylallophanimidate.

7. Method of claim 5 where the allophanimidate is methyl 4-(p-chlorophenyl)-N-methylthiolcarbonylallophanimidate.

8. Method of claim 2 where the crop is rice.

9. Method of claim 8 where the allophanimidate is methyl 4-(p-chlorophenyl)-N-methoxycarbonylallophanimidate.

10. Method of claim 8 where the allophanimidate is methyl 4-(p-chlorophenyl)-N-methylthiolcarbonylallophanimidate.

11. Method of claim 2 where the crop is wheat.

12. Method of claim 11 where the allophanimidate is methyl 4-(p-chlorophenyl)-N-methoxycarbonylallophanimidate.

13. Method of claim 11 where the allophanimidate is methyl 4-(p-chlorophenyl)-N-methylthiocarbonylallophanimidate.

14. Method for preventing inbreeding of corn to facilitate the production of hybrid seed which comprises applying an allophanimidate to the corn before or at tassel emergence in an amount sufficient to prevent self-fertilization but insufficient to cause substantial foliar burn, chlorosis, or necrosis, the allophanimidate being a compound of either of the following formulas:

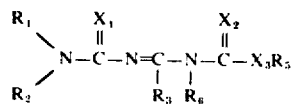

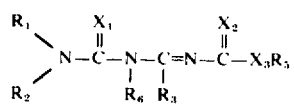

wherein $R_1$ is hydrogen;
$R_2$ is

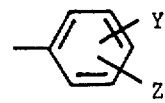

where
Y is hydrogen, halogen, or methyl; and
Z is halogen;
$R_3$ is $OR_4$;
$R_4$ is methyl or ethyl;
$R_5$ is methyl or ethyl;
$R_6$ is hydrogen;
$X_1$ and $X_2$ are oxygen; and
$X_3$ is oxygen or sulfur.

15. Method of claim 14 where the allophanimidate is methyl 4-(p-chlorophenyl)-N-methoxycarbonylallophanimidate.

16. Method of claim 14 where the allophanimidate is methyl 4-(p-chlorophenyl)-N-methylthiolcarbonylallophanimidate.

* * * * *